(No Model.)

T. A. EDISON.
ELECTRIC METER.

No. 406,824. Patented July 9, 1889.

Attest:
D. D. Mott
F. W. F. Orward

Inventor:
T. A. Edison
per Dyer & Wilber
Attys.

UNITED STATES PATENT OFFICE.

THOMAS A. EDISON, OF MENLO PARK, NEW JERSEY, ASSIGNOR TO THE EDISON ELECTRIC LIGHT COMPANY, OF NEW YORK, N. Y.

ELECTRIC METER.

SPECIFICATION forming part of Letters Patent No. 406,824, dated July 9, 1889.

Application filed January 31, 1881. Serial No. 25,093. (No model.)

*To all whom it may concern:*

Be it known that I, THOMAS A. EDISON, of Menlo Park, in the county of Middlesex and State of New Jersey, have invented a new and useful Improvement in Webermeters; and I do hereby declare that the following is a full and exact description of the same, reference being had to the accompanying drawings, and to the letters of reference marked thereon.

The object of this invention is to furnish means for measuring the quantity of electricity or electric energy used upon a closed electric circuit in any given time. The principle involved is the same as that fully set forth in a previous application for a patent by me made for a webermeter, the invention in this case consisting in the devices and combinations more particularly hereinafter set forth and claimed.

Figure 1:
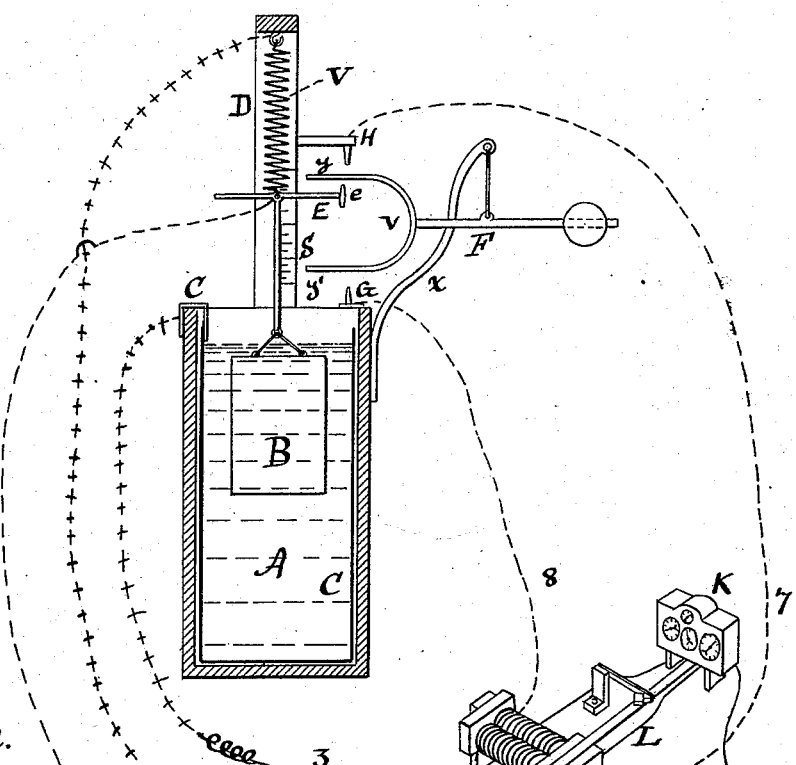
Figure 2:
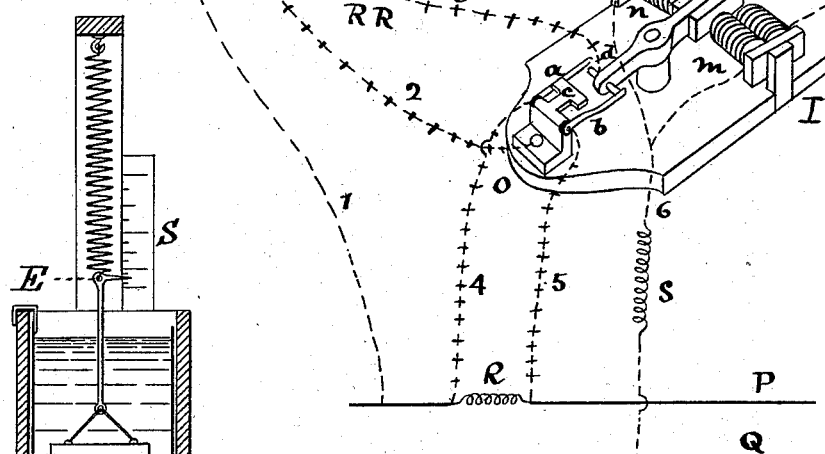

In the drawings, Figure 1 is a view, partly in section and partly in perspective, of the improved webermeter for measuring large quantities. Fig. 2 is a sectional view of a simple webermeter for measuring small amounts.

A is an electro-depositing cell, made of any suitable material, but lined on the inside with the metal C, which is to form one electrode thereof. At one point the metal lining is continued over the top of the cell to make connection with one of the leading-wires 3, or the wire may be taken through the outer case at any desired point, or the two may be united by a separate piece of metal.

A piece of metal B is suspended by a spring V to form the other electrode, the stress of the spring being so adjusted that it will sustain B at the top of the cell when there is a minimum of deposition on B, while the maximum of deposition will cause B to sink to the bottom of the cell. Upon the arm D, rising from or in the vicinity of A to support V, is placed a scale S, an index-arm being attached to B, so that the amount of deposition between the maximum and minimum of deposition may be visually indicated. From D projects a contact-arm H, while upon A is secured a contact G.

From an arm X, springing from the cell A or supported in any other suitable manner, depends a counterbalanced lever F, whose inner end is fashioned into a Y, whose ends $y$ $y'$ lie between H and G, while between them takes the prolongation $e$ of the index E, so that the rise and fall of B shall cause $y$ or $y'$ to contact with H or G, as the case may be.

I is a reversing and counting apparatus, consisting of the magnets $m$ $n$, between which plays the armature-lever L, whose outer end actuates the register K and whose inner end controls the reverser O. This reverser consists of two springy contacts $a$ $b$, secured to but insulated from a base having a conducting-tongue $c$, against which $a$ $b$ would normally take were it not that the pin $d$, in armature-lever L constantly lifts one or the other from contact with $c$.

$d$ is electrically connected to C, and $c$ to B. $a$ and $b$ are connected to P, one upon either side of the resistance R. By this construction, as seen, 4 is connected *via* 2 to B; but if the lever L should be moved, so that $d$ contacts with $a$ and lifts it from $c$, 4 would be connected *via* 3 with C.

P Q is the main circuit the current through which is to be measured. From it two branch circuits lead, one for actuating the reversing and registering apparatus, (represented by the broken-line circuits 1 6 7 8,) the other for causing electro-deposition. (Shown in broken crossed lines 2 3 4 5.)

Suppose now the current to be flowing from the left toward R, which is so placed and adjusted as to deflect through the webermeter a certain definite fraction of the current. Such fraction passes by 4 $a$ $c$ 2, spring V to B, which is now the anode, and thence to C, which is the cathode 3 $d$ $b$ 5 P. As B is lightened by the loss of metal, which is deposited on C, it rises, until finally the arm E carries $y$ against H, which closes the circuit 1, $e$ H 7 $m$ 6 causing $m$ to attract L, the latter in its movement operating the register K and the reverser O, so that now the webermeter-circuit becomes 4 $a$ $d$ 3 C (now the anode) to B (now the cathode) V 2 $c$ $b$ 5. When B becomes sufficiently weighted, it falls until $e$ places $y'$ against G, closing circuit through $n$, which, attracting L, causes another operation of the register and a restoration of the circuit through A to the condition first noted. This series of operations proceeds continuously, the register denoting each maximum and minimum deposition, while the index and scale denote the fractional deposition at any one moment.

Where only one or two lights are used and the current to be measured is comparatively small, the cell A and spring-suspended plate and index and scale may be used, as shown in Fig. 2, connections being made directly thereto by wires 4 and 5. As webers, weight of metal deposited, and the amount of light from a given number of feet of gas of standard quality bear a certain definite relation to each other, the scale S may be arranged to be read in either, whichever one is used being readily reducible to terms of the others.

What I claim is—

1. The webermeter, consisting of a cell, a spring-suspended electrode, and an index and scale, substantially as set forth.

2. The combination, in a webermeter, of a cell, a spring-suspended electrode therein, and means controlled thereby for reversing the circuit through the cell to cause such electrode to become alternately anode and cathode, substantially as set forth.

3. The combination, in a webermeter, of a cell, a spring-suspended electrode therein, and means controlled thereby for registering the rise and fall of such electrode in the cell, substantially as set forth.

4. The combination, with a suspended plate in a plating-cell, of means for registering the accurateness of maximum and minimum deposition thereon, and means for indicating the fractional depositions between the maximum and minimum, substantially as set forth.

5. The combination of the spring-suspended plate, an arm projecting therefrom, a counterbalanced yoke or Y, and two contacts, the arm of the plate controlling the movement of the yoke, substantially as set forth.

This specification signed and witnessed this 19th day of January, 1881.

THOS. A. EDISON.

Witnesses:
WM. CARMAN,
CHAS. CLARKE.